United States Patent [19]

Ib

[11] Patent Number: 6,115,617
[45] Date of Patent: Sep. 5, 2000

[54] HANDLING OF A LOCAL PHONE NUMBER DATABASE

[75] Inventor: Peter Ib, Herlev, Denmark

[73] Assignee: Nokia Mobile Phones Limited, Espoo, Finland

[21] Appl. No.: 09/025,641

[22] Filed: Feb. 18, 1998

[30] Foreign Application Priority Data

Feb. 21, 1997 [GB] United Kingdom .................. 9703644

[51] Int. Cl.[7] ...................................... H01S 4/00
[52] U.S. Cl. ........................... 455/564; 455/558; 379/356
[58] Field of Search .................... 455/558, 550, 455/186.1, 564, 565, 551; 379/356, 90, 357

[56] References Cited

U.S. PATENT DOCUMENTS

| | | | |
|---|---|---|---|
| 5,134,717 | 7/1992 | Sogaard-Rasmussen | 455/564 |
| 5,394,462 | 2/1995 | Maemura | 379/142 |
| 5,479,476 | 12/1995 | Finke-Anlauff | 379/58 |
| 5,768,362 | 6/1998 | Moon | 379/356 |
| 5,838,784 | 11/1998 | Yu | 379/356 |

FOREIGN PATENT DOCUMENTS

0410344 A2  1/1991  European Pat. Off. .
2266797    11/1993  United Kingdom .

*Primary Examiner*—Creighton Smith
*Attorney, Agent, or Firm*—Perman & Green, LLP

[57] ABSTRACT

When it is attempted to enter a phone number and a corresponding ID name into an already full phone book database for a phone, the phone temporarily stores the phone number and ID name in an intermediate memory. Then the phone asks the user whether he wants to overwrite an existing phone number and ID name in a memory location of the phone book. The user is allowed to point out a memory location to overwrite, and then the contents of the intermediate memory are transferred to the memory location pointed out for storage.

10 Claims, 3 Drawing Sheets

HANDLING OF A LOCAL PHONE NUMBER DATABASE

BACKGROUND OF THE INVENTION

The invention relates to a method of handling phone numbers to be stored in a phone number database memory when all memory locations are full. The invention furthermore relates to a phone having such a database memory.

It is very convenient to use the phone number database as a phone book, because a call may be established easily from the database. However, it is desired to create the phone number database on the SIM card. The resulting database will follow the SIM card and thus the phone subscription instead of the phone. When the SIM card is transferred from one phone to another, the database will follow the SIM card. However only a limited number of memory locations (typically about 100) will be available in the SIM card memory.

The user may typically save about 100 phone numbers having up to 30 digits and an associated name of about 15 letters. These data may vary from SIM card supplier to SIM card supplier. The phone numbers will typically be stored in serially numbered memory locations, e.g. 1–100. A group of phone numbers—typically the numbers stored in the memory locations 2–9—will be accessible as short dialing numbers, which means that in the idle mode of the phone the user can make a call to a phone number stored in e.g. location #3 by depressing the "3" key for e.g. 0.5–1.0 second.

When such a database becomes full and the user tries to store a new number, this will be rejected until the contents of one of the memory locations have been deleted.

SUMMARY OF THE INVENTION

In accordance with the invention there is provided a method of handling entries into an already full phone book database for a phone, comprising detecting a user entry as a phone number and ID name to be stored in the phone book, temporarily storing said phone number and ID name in an intermediate memory, asking the user whether he wants to overwrite an existing phone number and ID name in a memory location of the phone book, allowing the user to point out a memory location to overwrite, and transferring the contents of the intermediate memory to the memory location pointed out for storage. Hereby the user is allowed to select an existing memory location after having tried to store the number in the normal way. The user may scroll through the already stored phone numbers and may select a location with phone number for overwriting with the number to be stored.

The invention provides a method enabling the user with few instructions to transfer a new phone into an occupied memory location without losing information to be saved.

The phone number and a corresponding ID name will normally be entered by a set of alphanumeric keys, while the phone is instructed to save the entered number by means of a multi-functionality key. When the database memory is full, the controller asks the user to accept overwriting and suggests an already stored phone number and ID name for the overwriting operation. Preferably, the controller suggests the first phone number and ID name arranged alphabetically by ID name for the overwriting operation. If the user does not want to use this memory location, he is allowed to go to another memory location for that purpose. If he regrets, he may depress "c" to escape the phone book without saving the entered number.

The invention moreover relates to a phone having a phone book database memory including a plurality of memory locations each of which is able to contain a phone number and a corresponding ID name. The phone further comprises information entering means for entering information into the phone, a display for displaying information, an intermediate memory for storing displayed numbers temporarily, a controller for controlling entering, display and storage of information. The controller searches for an empty memory location in phone book database memory upon request for storing a displayed number. When said phone book database memory is detected to be full, the controller asks the user in said display whether he wants to overwrite an existing memory location. If the user accepts, the controller transfers the contents of the intermediate memory to the memory location pointed out for storage. Hereby, the entered phone number will be stored in the intermediate memory until a suitable memory location has been found.

The inventive concept is very useful for intelligent phones searching in the phone book database for an empty memory location for storing the new data entry to be stored. According to the invention the user might find an appropriate memory location for overwriting. According to prior art his request for storing the new data entry would simply be rejected. Then the user would have to erase a used memory location and then re-enter the data entry once more.

BRIEF DESCRIPTION OF THE DRAWINGS

The invention will be explained more fully below in connection with a preferred embodiment and with reference to the drawing, in which.

DETAILED DESCRIPTION OF THE INVENTION

Figure 1:
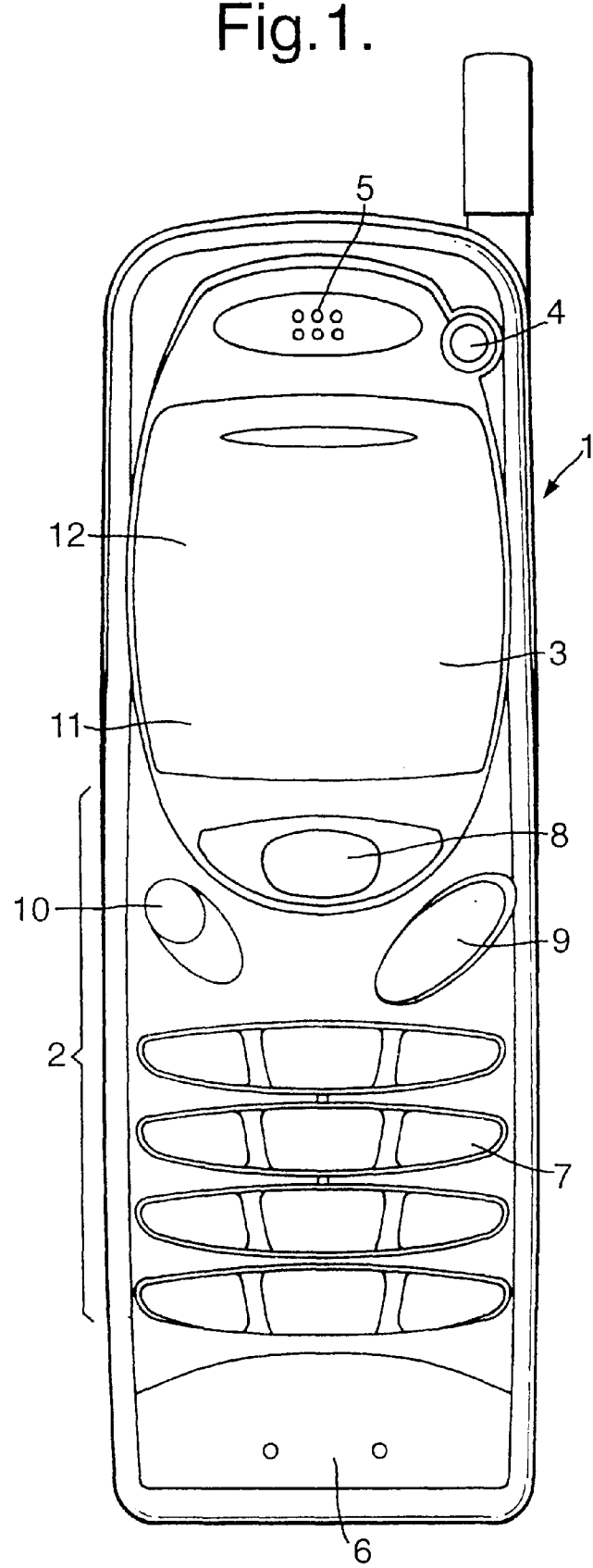
FIG. 1 shows a preferred embodiment of a portable phone having a user interface according to the invention.

FIG. 1 shows a preferred embodiment of a radiophone according to the invention, and it will be seen that the phone, which is generally designated by 1, comprises a user interface having a keypad 2, a display 3, an on/off button 4, an earpiece 5, and a microphone 6. The keypad 2 has a first group 7 of keys in the form of alphanumeric keys, by means of which the user can enter a phone number, write a text message (SMS), write a name (associated with the phone number), etc. The user uses the first group of keys primarily for entering data in the phone (entry events).

The keypad 2 additionally comprises a second group of keys which, in the preferred embodiment, comprises precisely one multi-functionality key 8 or soft key whose function depends on the present state of the phone. The default function or the present function of the multi-functionality key 8 is displayed in a predetermined area 11 of the display 3. A basic display area 12 displays the dialog (exchange of information) between the phone and the user. In the preferred embodiment, the second group of keys additionally comprises a scroll key 9 by means of which the user can jump selectively from one item to the preceding or the succeeding item in the menu loop of the phone, while he gets access to a submenu loop under the item concerned in the main menu loop by activation of the operation key. The clear key 10 may be used e.g. for erasing the digit or letter entered last by brief depression, while depression of a longer duration will erase the entire number or word. Like the multi-functionality key 8, the scroll key 9 and the clear key 10 may advantageously be redefined in some states, which appears from the following.

Figure 2:
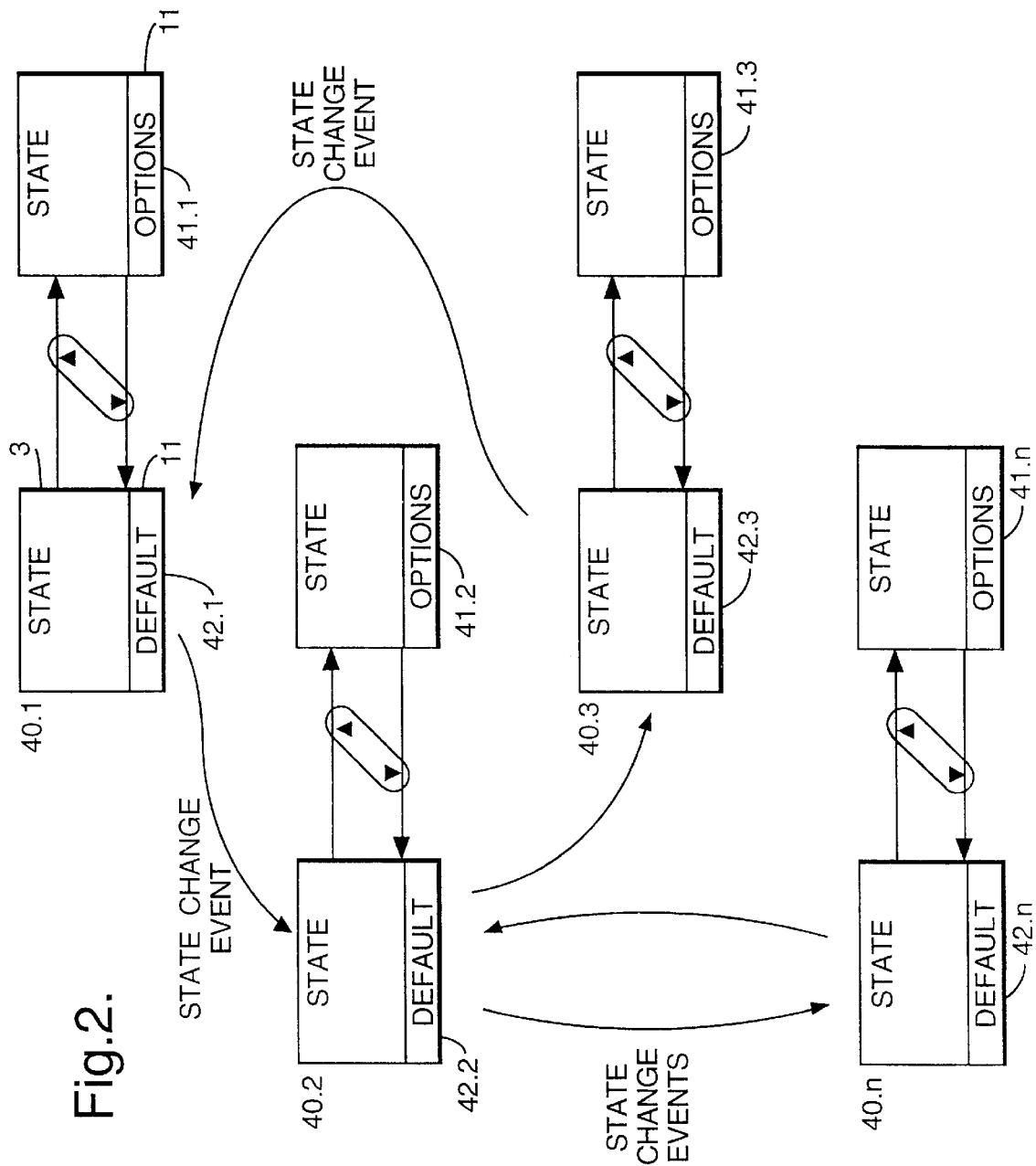
FIG. 2 shows switching between the states of the phone.

The invention is based on the idea that the telephone can assume a plurality of predetermined states 40.1–40.n, which is illustrated in FIG. 2. A plurality of actions (options 41.1–41.n) may be performed in these states 40.1–40.n. The display image on arrival at state 40.1 may be a phone number or the name of a person contained in the phone book of the phone, which is indicated by "state". "State" might also cover "incoming calls", "E-mail received", "SMS received", etc. If the display contains a phone number, the default function 42.1–42.n might be "call". The scroll key 8 allows switching from the default function to the group of possible functions to which the default function belongs. It is noted that, in the preferred embodiment, the scroll key 8 toggles between the default function and the group of possible functions (options), but switches between items in the group of possible functions once this group has been selected by means of the operation key. The state is maintained during toggling and scrolling through the options.

As will be seen from FIG. 2, a state change event will result in a change from one state to another. The new state depends on the old state and the nature of the state change event. During an established call ("call established" state), the default function of the operation key 8 will be "end" according to the preferred embodiment. If a new incoming call "is waiting", the user may use the scroll key 9 to produce the option list including items such as "end", "join", "answer" and "swap" without interrupting the call.

Each state 40.1–40.n is associated with a predefined group of functions, actions or options 41.1–41.n which are possible precisely for that state. Establishment of conference calls, e.g., can be perform ed only when a call has already been established. A preferred function serving as the default function 42.1–42.n is designated in each of these groups. This designation may be performed by the programmer during programming, by the user through his redefinition of the default function, or by the phone itself in that it records the frequency of the use of the individual functions and appoints the most frequently used one in each group as the default function—optionally with the user's acceptance.

When the phone changes its state, the operation key can perform the default function if it is activated, and the user may toggle between the default function and the whole group of options by means of the scroll key. If the group of options is selected with the operation key, the user will be able to scroll through the group of options with the scroll key and to select the desired (designated) function with the operation key.

When a function is selected with the operation key, the processor 13 runs the associated program sequence to execute the function.

Figure 3:
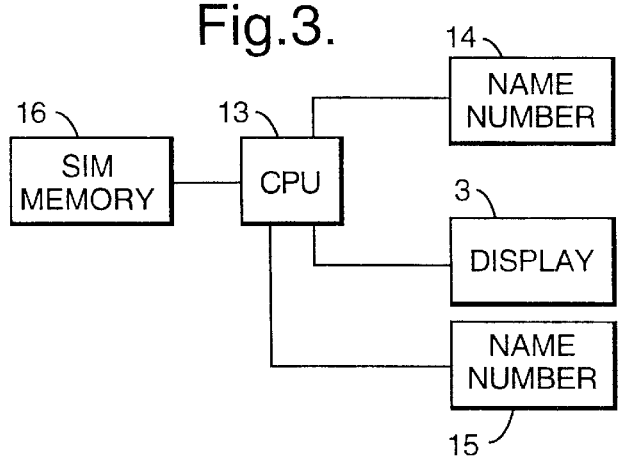
FIG. 3 shows some important components inside the phone used in a preferred embodiment of the phone according to the invention.

As will be seen from FIG. 3, when the user enters a number and a name or ID name into the phone via the alphanumeric keys 7, the CPU 13 stores these data temporarily in a first intermediate memory 14 and displays the data in the display 3. When the user wants to display a number stored in the phone book, the CPU 13 copies the contents of a selected memory location on the SIM memory 16 to a second intermediate memory 15 and displays the data on the display 3.

The SIM card memory is constructed as a fixed number of memory locations, e.g. 100. A phone number and a corresponding name may be stored in each memory location. Table 1 shows an example of the construction of such a database memory.

TABLE 1

| Memory location no. | Name | Phone no. |
| --- | --- | --- |
| 1 | voice mail box | +45 50 50 50 50 |
| 2 | Gill | +46 59 3111 45 |
| 3 | Jane | +49 89 600 0662 |
| 4 | Jones | +44 1233 4561 |
| ... | | |
| 96 | Andy Finck | +358135159541 |
| 97 | Bobby M | +4544225643 |
| 98 | John | +39 35 200 222 |
| 99 | Cathy J | +442443365854 |
| 100 | Jackie | +358 0 444 444 |

Figure 4:
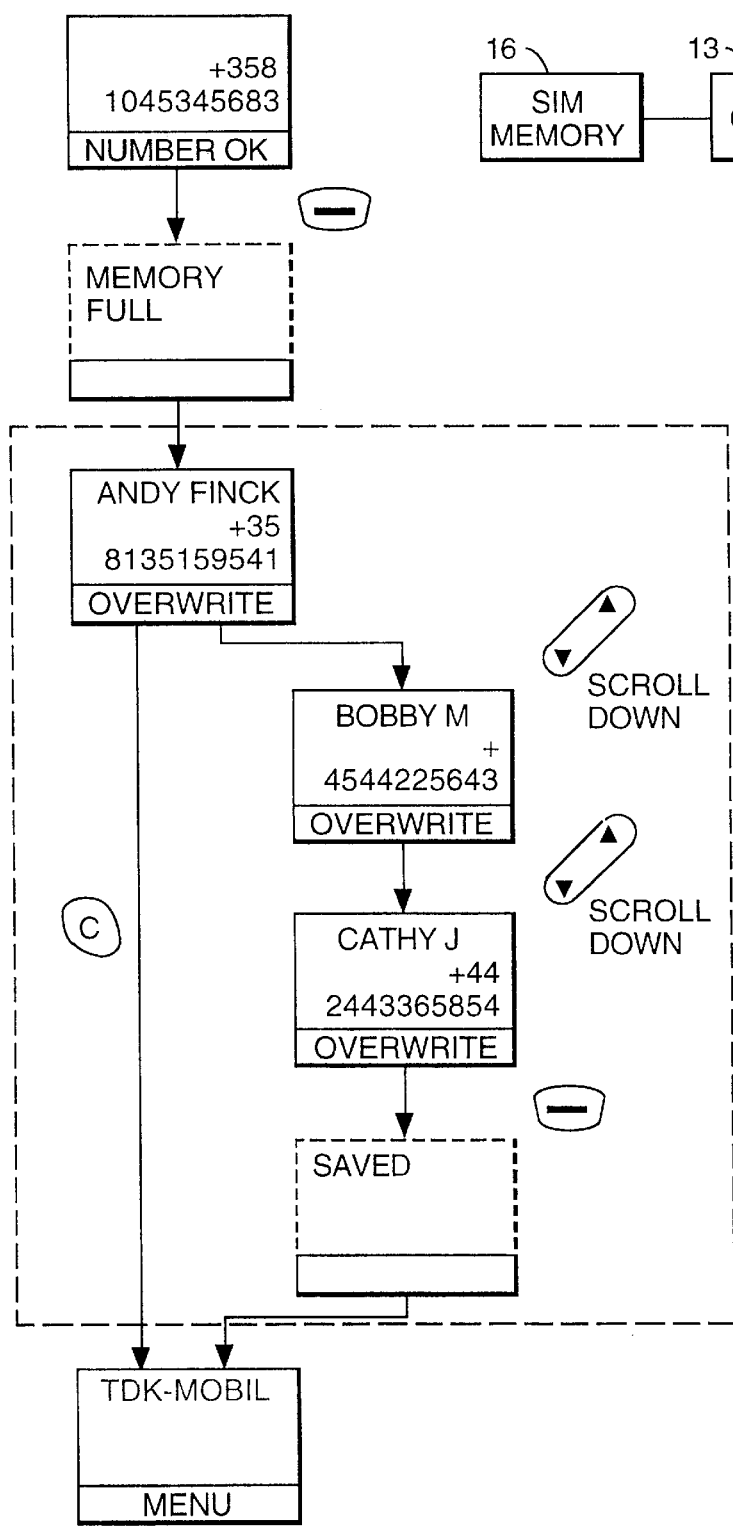
FIG. 4 illustrates a sequence of display images appearing in the performance of the method according to the invention.

FIG. 4 shows a scenario where the user wants to input a new phone number into the SIM memory 16. The user has already entered the name in an "enter into the phone book mode". In the first image in the sequence he has just entered the corresponding phone number, too. The phone asks the user whether the number is correct. The functionality (number OK) of the multi-functionality key 8 is displayed in the separate area 11 of the display.

The user accepts by depressing the multi-functionality key 8. As far as the SIM memory is not full, the CPU 13 will just find an empty memory location for storing the entered data. However, when the SIM memory has become full, this is not possible. According to the invention the phone replies by writing "memory full" in the basic display area 12, and shortly afterwards it automatically displays a new display image in which the functionality of the multi-functionality key 8 has changed to overwrite. The basic display area 12 displays the first item from the phone book data arranged in alphabetic order. At the present time, this name is Andy Finck. If, after all, the user does not want to save the entered number, he may simply depress the "c"-key so that no amendments are introduced into the phone book.

The user may instead use the scroll key 9 for scrolling through the names. When he finds a name "Cathy J" for overwriting, he just depresses the multi-functionality key 8, and the data will be transferred from the intermediate memory 14 to the memory location of "Cathy J" in the SIM card memory 16. When the storing has been executed, the phone returns to idle mode.

The user may be allowed to use the alphanumeric keys for the jumping in the database memory 16. By depressing the "5/jkl" key the CPU 13 finds the first name starting with "j".

The present invention includes any novel feature or combination of features disclosed herein either explicitly or any generalisation thereof irrespective of whether or not it relates to the claimed invention or mitigates any or all of the problems addressed.

In view of the foregoing description it will be evident to a person skilled in the art that various modifications may be made within the scope of the invention.

What is claimed is:

1. A method of handling entries into an already full phone book database for a phone, comprising:

detecting a user entry as a phone number and ID name to be stored in the phone book;

temporarily storing said phone number and ID name in an intermediate memory;

asking the user whether he wants to overwrite an existing phone number and ID name in a memory location of the phone book;

allowing the user to point out a memory location to overwrite; and transferring the contents of the intermediate memory to the memory location pointed out for storage.

2. A method according to claim 1 wherein the user enters the phone number and a corresponding ID name by means of a set of alphanumeric keys and instructs the phone to save the entered number by means of a multi-functionality key.

3. A method according to claim 1 wherein a controller of the phone asks the user to accept overwriting and suggests an already stored phone number and ID name for the overwriting operation.

4. A method according to claim 3 wherein the controller for the overwriting operation suggests the first phone number and ID name arranged alphabetically by ID name.

5. A method according to claim 4 wherein the controller allows the user to jump between memory locations prior to the overwriting of the memory location pointed out.

6. A phone having a phone book database memory including a plurality of memory location s each of which is able to contain a phone number and a corresponding ID name, said phone further comprising:

information entering means for entering information into the phone;

a display for displaying information;

an intermediate memory for storing displayed numbers temporarily;

a controller for controlling entering, display and storage of information;

said controller searches for an empty memory location in the phone book database memory upon request for storing a displayed number;

when said phone book database memory is detected to be full, the controller asks the user in said display whether he wants to overwrite an existing memory location; and if the user accepts, the controller transfers the contents of the intermediate memory to the memory location pointed out for storage.

7. A phone according to claim 6 wherein the information entering means comprises a set of alphanumeric keys and at least one multi-functionality key to instruct the phone to save the entered number.

8. A phone according to claim 6 wherein the display is provided with a basic display area for displaying said phone numbers and the corresponding ID names, and a separate field for displaying the present functionality of the multi-functionality key.

9. A phone according to claim 8 wherein the controller suggests the first phone number and ID name of the phone book database memory arranged alphabetically by ID name for the overwriting operation and displays the name in said basic display area.

10. A phone according to claim 9 wherein the controller allows the user to jump by means of a scrolling device between memory locations prior to the overwriting of the memory location pointed out.

* * * * *